United States Patent
Hoshino

[11] Patent Number: 6,065,179
[45] Date of Patent: May 23, 2000

[54] WIPER DEVICE WITH LINEAR WIPE PATTERN

[75] Inventor: Takashi Hoshino, Isezaki, Japan

[73] Assignee: Mitsuba Corporation, Kiryu, Japan

[21] Appl. No.: 09/138,895

[22] Filed: Aug. 24, 1998

[30] Foreign Application Priority Data

Sep. 26, 1997 [JP] Japan ..................................... 9-279740

[51] Int. Cl.$^7$ .................................. B60S 1/36; B60S 1/32; B60S 1/44
[52] U.S. Cl. ..................................... 15/250.21; 15/250.23; 15/250.29
[58] Field of Search ............................ 15/250.23, 250.21, 15/250.29, 250.003, 250.3, 250.13

[56] References Cited

U.S. PATENT DOCUMENTS

| | | | |
|---|---|---|---|
| 2,324,894 | 7/1943 | Whitted | 15/250.23 |
| 3,688,334 | 9/1972 | Peterson | 15/250.23 |
| 4,641,390 | 2/1987 | Michalke | 15/250.23 |
| 5,119,524 | 6/1992 | Miller | 15/250.23 |

FOREIGN PATENT DOCUMENTS

| | | | |
|---|---|---|---|
| 13138 | 1/1979 | Japan | 15/250.23 |
| 159073 | 9/1983 | Japan | 15/250.23 |
| 4-173452 | 6/1992 | Japan . | |
| 1202927 | 1/1986 | U.S.S.R. | 15/250.23 |
| 1190426 | 5/1970 | United Kingdom | 15/250.23 |

*Primary Examiner*—Gary K. Graham
*Attorney, Agent, or Firm*—Oliff & Berridge, PLC

[57] ABSTRACT

A wiper device having a simple structure by which nearly the entire rectangular windshield surface of a vehicle can be wiped. In the wiper device, an arm comprises a drive link adapted to reciprocatively swing according to a drive operation of a wiper drive unit, a connecting link swingably and pivotally supported at an extreme end portion of the drive link, an operating link having a base end portion integrally fixed to the connecting link, a guide link that has a base end portion, which is swingably and pivotally supported on the vehicle body, and an extreme end portion, which is swingably and pivotally supported on the other end portion of the connecting link, and that is operative to guide the operating link in such a manner that the extreme end portion of the operating link reciprocatively moves in an approximately straight line with a reciprocative movement of the drive link, a supporting link swingably and pivotally supported at the extreme end portion of the operating link, and a holding link that has an extreme end portion, which is swingably and pivotally supported on the supporting link, and a base end portion, which is swingably and pivotally supported on the guide link, and that is operative to hold the supporting link in such a manner that the angle ($\theta$) between the supporting link and the movement locus (A) of the extreme end portion of the operating link is maintained at a nearly constant value.

16 Claims, 7 Drawing Sheets

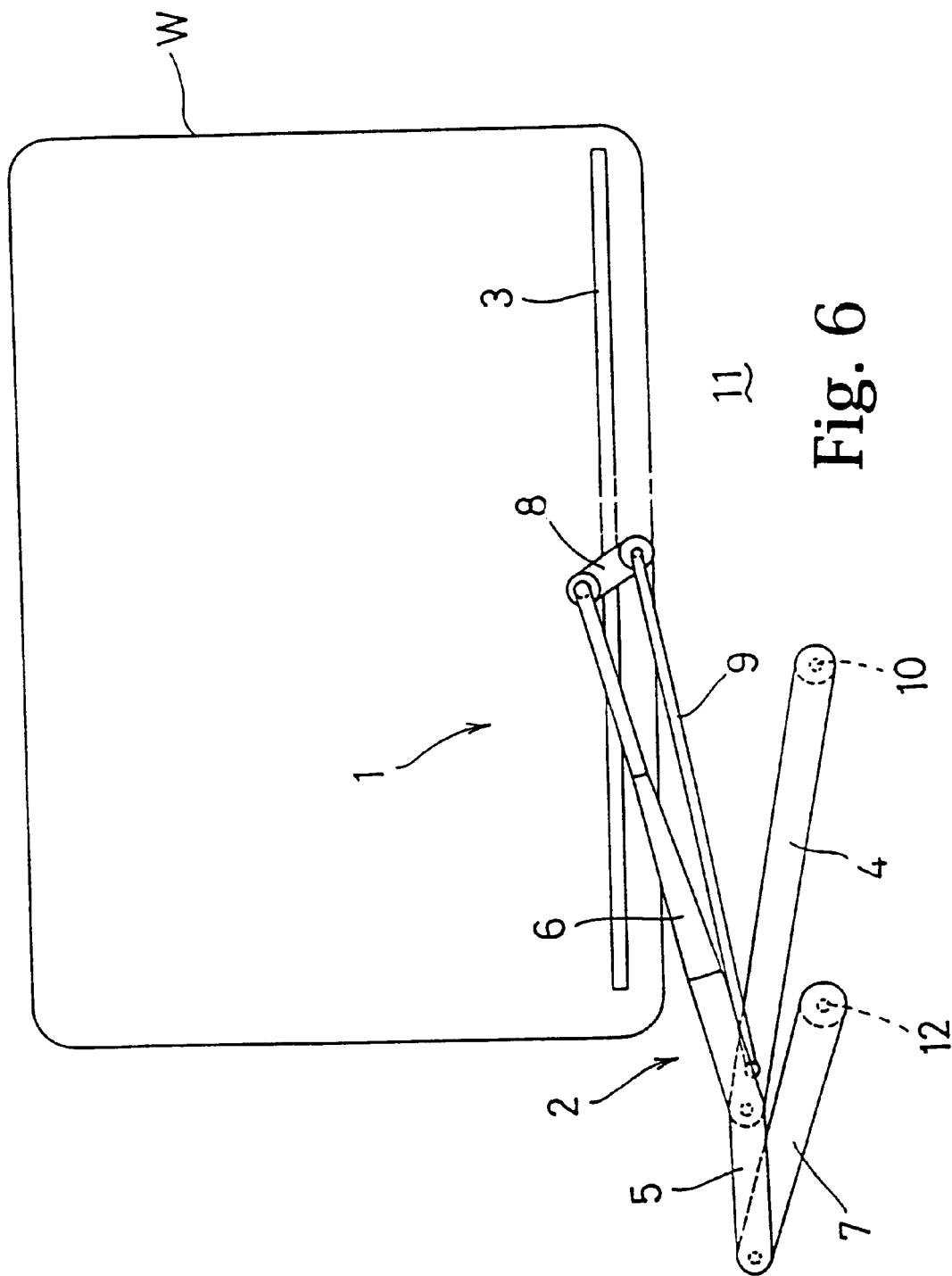

WIPER DEVICE WITH LINEAR WIPE PATTERN

BACKGROUND OF THE INVENTION

1. Field of the Invention

The invention relates to a wiper device provided in a vehicle, such as an automobile or a truck.

2. Description of the Related Art

Generally, such a wiper device is adapted to wipe a windshield surface of a vehicle by the reciprocating movement of a blade, which is caused by a driving operation of a wiper drive unit. Hitherto, a device, in which each of blades 13 swings in an arc, as illustrated in FIGS. 7(A) and 7(B), has been known as a type conventional wiper device.

Meanwhile, in recent years, windshields of various shapes have been provided in vehicles to improve the design and visibility thereof. For example, in the case where a rectangular windshield is used, the conventional wiper device, in which each of the blades 13 is adapted to simply swing in an arc, has encountered a problem in that there are many regions B, as shown in FIGS. 7(A) and 7(B), which have been left unwiped, on the windshield surface.

Thus, there has been proposed another wiper device, configured so that the parallel displacement of blades is achieved by using two sets of parallel links and a gear mechanism interposed therebetween, as disclosed in the Japanese Unexamined Patent Publication No. 4-173452. Using such a wiper device, nearly the entire rectangular windshield surface can be wiped.

This latter wiper device, however, requires the gear mechanism and thus has problems in that the number of components is large and that the configuration is complex. Further, such a wiper device has another problem in that the aforementioned two sets of parallel links are provided in such a way as to cover the windshield surface so they obstruct a driver's view not only when the blades perform the wiping operation, but also when the blades are not performing the wiping operation. It is, thus, difficult to employ such a wiper device for a vehicle. The invention is created to solve the problems of the described wiper devices.

SUMMARY OF THE INVENTION

Accordingly, an object of the invention is to provide a wiper device which can solve the aforementioned problems of the above-described wiper devices.

To achieve the foregoing object, in accordance with the invention, there is provided a wiper device in which an arm for moving a blade to be used to wipe a windshield surface comprises a drive link that has a base end portion which is swingably and pivotally supported on a vehicle body and that reciprocatively swings according to a drive operation of a wiper drive unit; a connecting link having an end portion that is swingably and pivotally supported at an extreme end portion of the aforesaid drive link; an operating link having a base end portion integrally fixed to the aforesaid connecting link; a guide link that has a base end portion, which is swingably and pivotally supported on the aforesaid vehicle body; and an extreme end portion, which is swingably and pivotally supported on the other end portion of the aforesaid connecting link, and that is operative to guide the aforesaid operating link in such a manner that the extreme end portion of the aforesaid operating link reciprocatively moves in an approximately straight line with a reciprocative movement of the aforesaid drive link; a supporting link, to which the aforesaid blade is fixed, the aforesaid supporting link having an end portion that is swingably and pivotally supported at the extreme end portion of the aforesaid operating link; and a holding link that has an extreme end portion, which is swingably and pivotally supported at the other end portion of the aforesaid supporting link, and a base end portion, which is swingably and pivotally supported on the aforesaid guide link or the aforesaid drive link, and that is operative to hold the aforesaid supporting link in such a manner that the angle between the aforesaid supporting link and a movement locus of the aforesaid extreme end portion of the aforesaid operating link is maintained at a nearly constant value.

Further, with such a configuration, the blade reciprocatively moves parallel to itself. Thus, the wiper device of the invention can wipe substantially the entire rectangular windshield surface. Moreover, the wiper device comprises only the links and does not require other mechanisms, such as a gear mechanism. Consequently, the wiper device has a simple structure and limits the number of components.

BRIEF DESCRIPTION OF THE DRAWINGS

Other features, objects and advantages of the invention will become apparent from the following description of preferred embodiments with reference to the drawings in which like reference characters designate like or corresponding parts throughout several views, and in which:

FIG. 6 is a front view of a third embodiment of a wiper device of the invention.

DETAILED DESCRIPTION OF THE PREFERRED EMBODIMENTS

Figure 1:
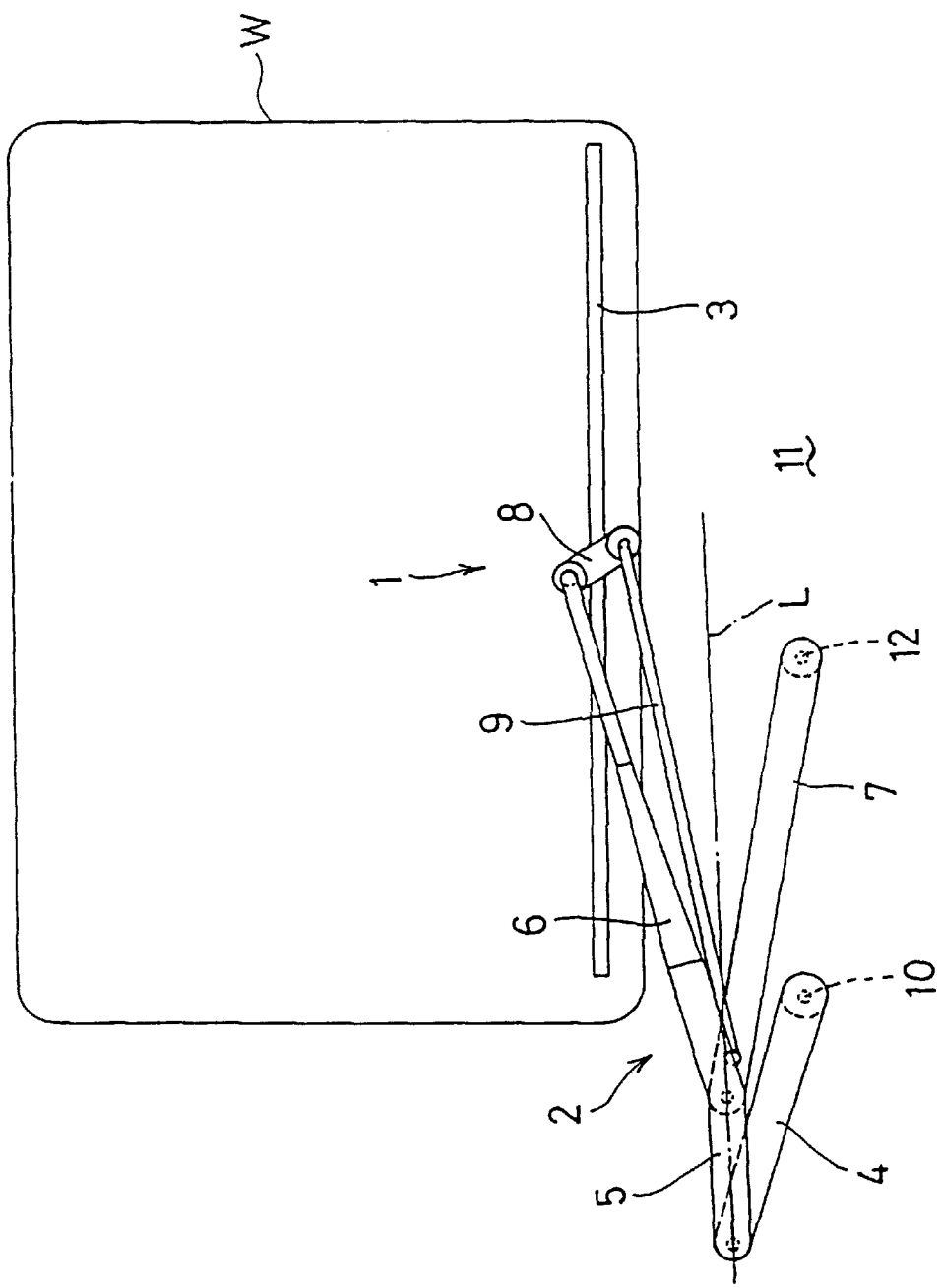
FIG. 1 is a front view of a first embodiment of a wiper device, of the invention, at the time when the blade stops performing the wiping operation and is at the lowest position.
Figure 2:
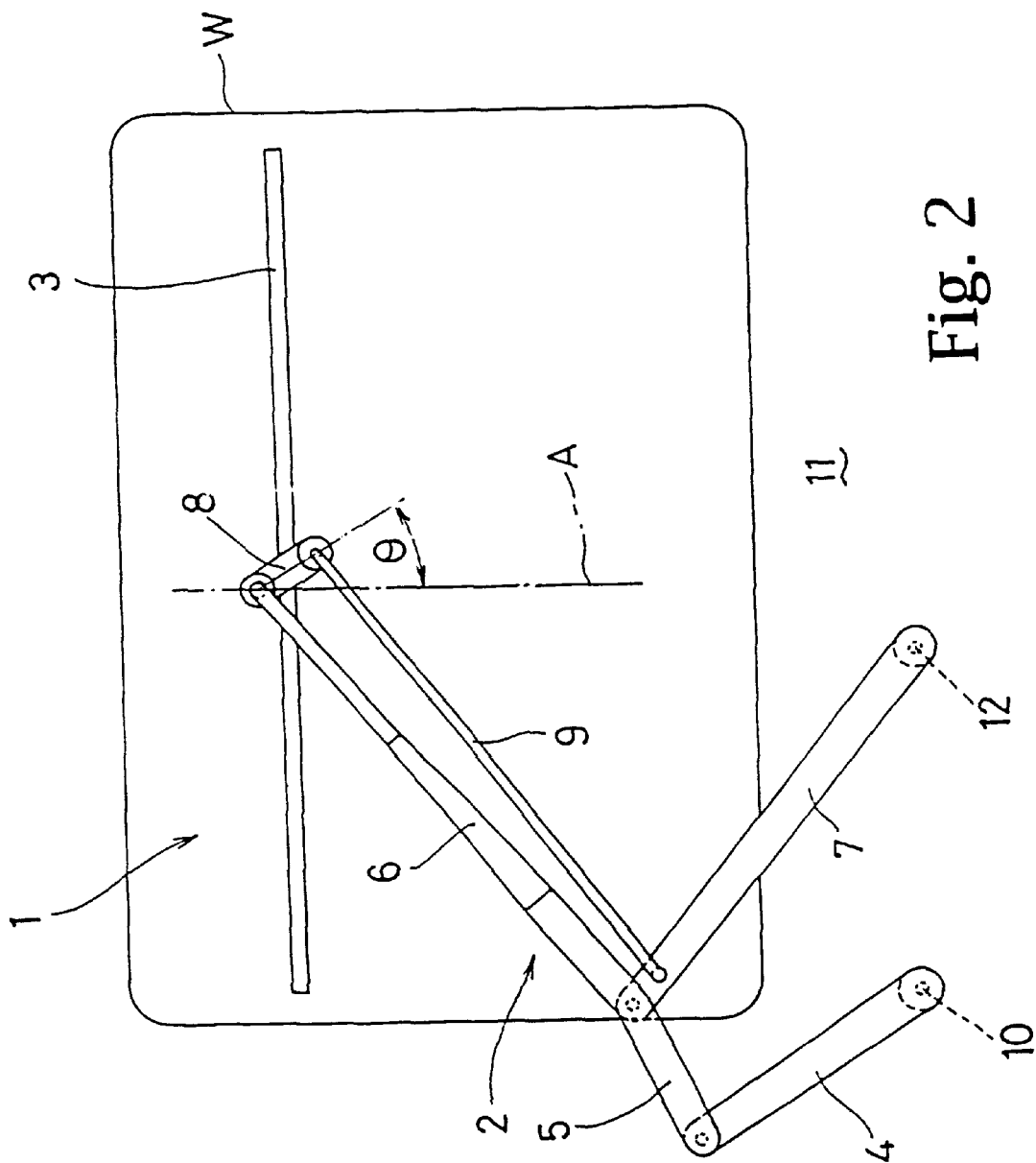
FIG. 2 is a front view of the wiper device as the blade performs wiping operations.
Figure 3:
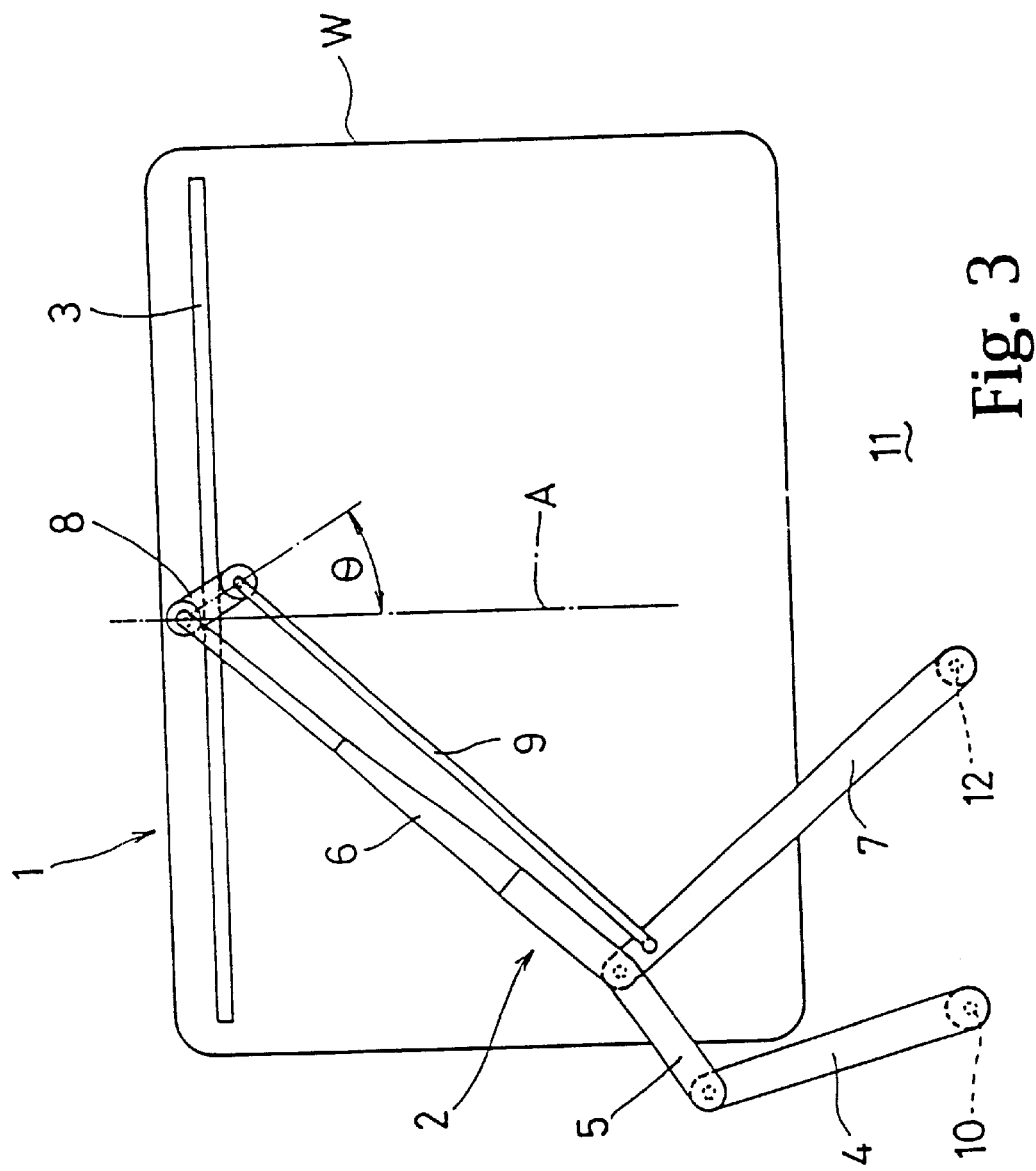
FIG. 3 is a front view of the wiper device when the blade is at the highest position.
Figure 4:
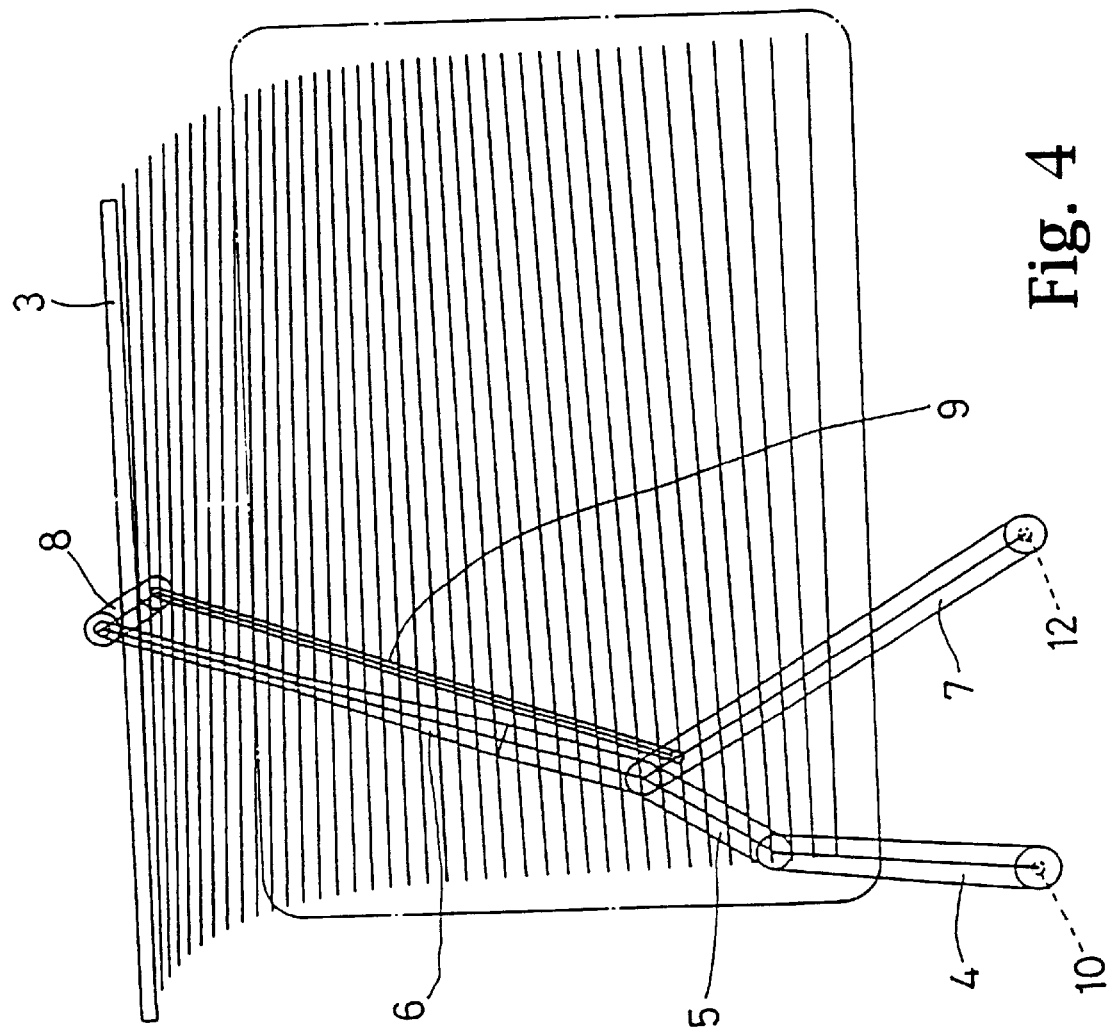
FIG. 4 is a diagram illustrating an example of a simulation performed by a computer.

First, a first embodiment of the invention will be described in detail hereinafter by referring to the accompanying drawings. In FIGS. 1 to 3, reference numeral 1 designates a wiper device that is provided in a vehicle and is used for wiping a windshield surface W of the vehicle. The wiper device 1 comprises a drive unit (not shown), the drive unit being, for example, an electric motor provided with a speed reduction mechanism; an arm 2 (to be described later) that operates according to the driving operation of the drive unit; and a blade 3 that reciprocatively moves according to the operation of the arm 2 to wipe the windshield surface. In this embodiment, the windshield surface has a substantially rectangular shape.

The arm 2 is a seven joint-link mechanism having six links. The six links are a drive link 4, a connecting link 5, an operating link 6, a guide link 7, a supporting link 8 and a holding link 9.

A base end portion of the drive link 4 is integrally mounted on a pivot shaft 10. The pivot shaft 10 is axially rotatably mounted on an outside plate 11 of the vehicle and is interlocked with and connected to the drive unit. Further, the device is structured so that the drive link 4 reciprocatively moves as the pivot shaft 10 rotates around the axis of rotation thereof according to a driving operation of the drive unit.

Moreover, a base end portion of the connecting link 5 is swingably and pivotally supported at an extreme end portion of the drive link 4. Furthermore, a base end portion of the operating link 6 is integrally fixed to the extreme end portion of the connecting link 5. The connecting link 5 and the operating link 6 may be formed in such a manner as to be integral with each other. Alternatively, the connecting link 5 and the operating link 6 may be formed separately from one another and fixed integrally to each other to form a unitary structure. In this embodiment, the connecting link 5 and the operating link 6 are formed in such a manner as to be integral with each other. Moreover, the links are configured so that the extreme (or tip) end portion of the operating link 6 is placed above an extension line L (dot-dash line) of the connecting link 5 extended in the direction of, and from the extreme end of connecting link 5 as illustrated in FIG. 1.

On the other hand, a base end portion of the guide link 7 is swingably and pivotally supported on an outside plate 11 of the vehicle body through a supporting shaft (or spindle) 12. Further, an extreme end portion of the guide link 7 is swingably and pivotally supported at the extreme end portion of the connecting link 5, substantially where the connecting link 5 and the operating link 6 are joined. Moreover, the guide link 7 swings by linking with the swinging motion of the connecting link 5, which is caused by the reciprocative swinging motion of the drive link 4. The guide link 7 guides the operating link 6 so that the extreme end portion of the operating link 6, which integrally swings together with the connecting link 5, performs a reciprocative swinging motion in an approximately straight line upwardly and downwardly in a laterally central part of the windshield surface W.

The blade 3 is fixed to and supported on a middle part of the supporting link 8. Additionally, the extreme end portion of the operating link 6 is swingably and pivotally supported at the extreme end portion of the supporting link 8.

Further, an extreme end portion of the holding link 9 is swingably and pivotally supported at a base end portion of the supporting link 8. A base end portion of the holding link 9 is swingably and pivotally supported on a middle portion of the guide link 7. Further, the holding link 9 holds the supporting link 8 so that, when the reciprocative swinging motion of the drive link 4 causes the extreme end portion of the operating link 6 to reciprocatively swing upwardly and downwardly as described above, an angle θ between the supporting link 8 and the movement locus A (FIG. 2) of the extreme end portion of the operating link 6 is maintained at a nearly constant value in such a way that the blade 3 maintained in a constant orientation substantially parallel to the top and bottom of the windshield.

Incidentally, when the wiping operation is stopped, the blade 3 is placed in a lower part of the windshield surface W as illustrated in FIG. 1. In this position, the drive link 4, the connecting link 5 and the guide link 7 are positioned outside the windshield surface W in such a manner as not to cover or obstruct the view through the windshield surface W. Further, when stopping the wiping operation, the supporting link 8 and a part of each of the operating link 6 and the holding link 9 are placed in such a way as to overlap with one another at the bottom part of the windshield surface W.

In this case, as described above, the extreme end portion of the operating link 6 is above the extension line L drawn by extending the connecting link 5 in the direction of the extreme end thereof. Thus, the amount of the operating link 6 which overlaps with the windshield surface W can be reduced. Consequently, the device of the invention avoids obstructing a driver's view by the arm 2 as much as possible.

Figure 5:
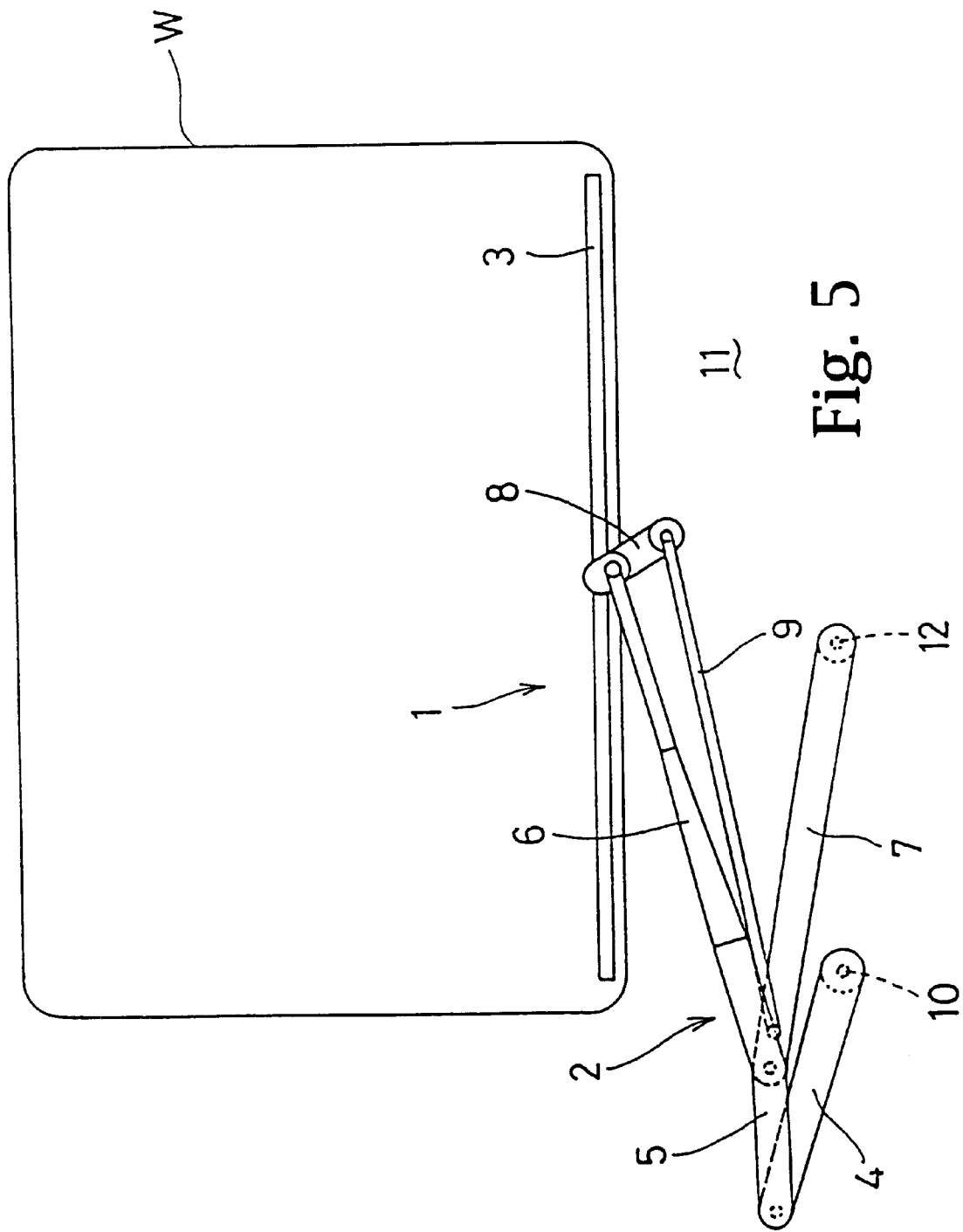
FIG. 5 is a front view of a second embodiment of the wiper device of the invention.
Figure 7A:
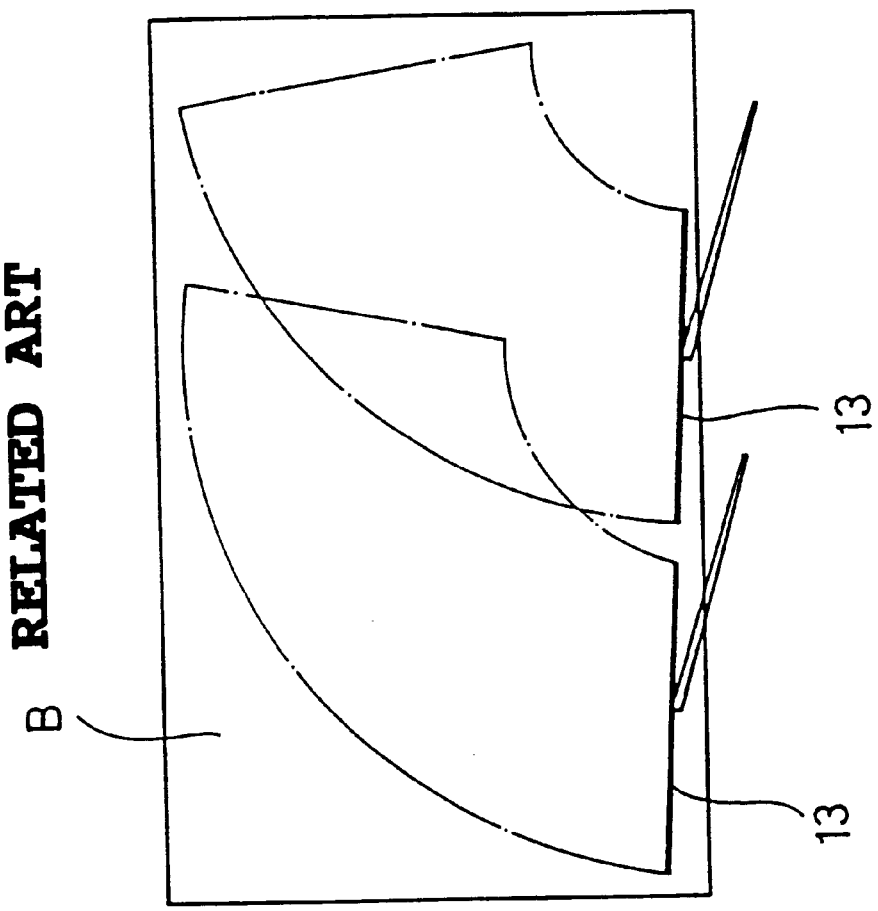
FIGS. 7(A) and 7(B) are front views of a conventional wiper device.
Figure 7B:
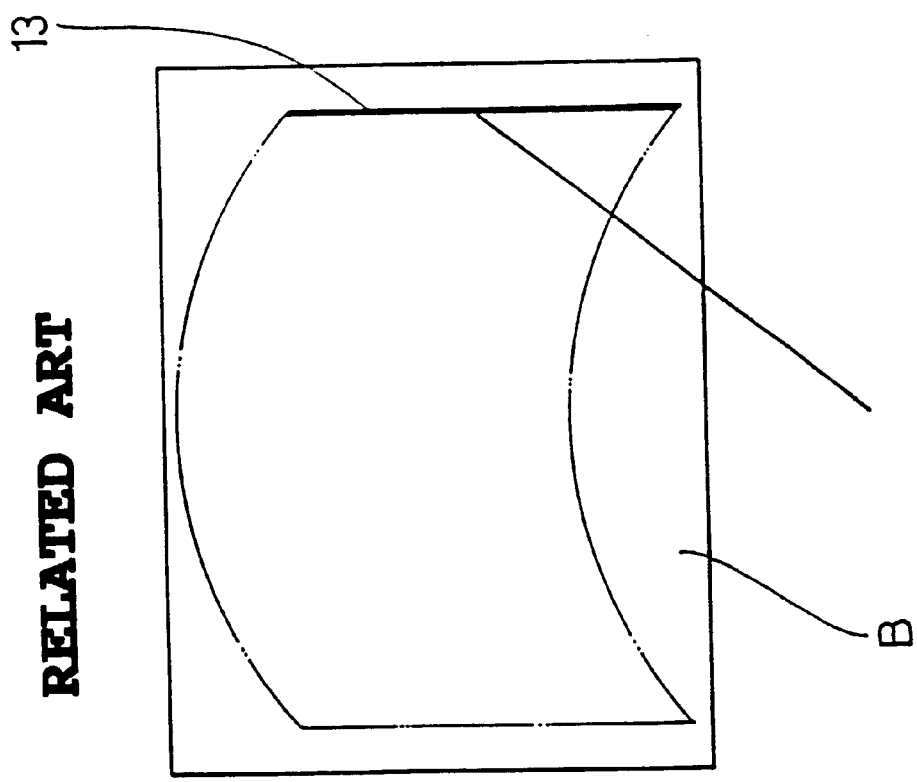

When stopping the wiping operation, not only the drive link 4, the connecting link 5 and the guide link 7 but also the operating link 6 and the holding link 9 can be positioned outside (below) the windshield surface W by structuring the device so that the supporting link 8 is extended in the direction of its extreme end portion and supporting and fixing the blade 3 at an end portion of the extension as in the case of a second embodiment of the invention illustrated in FIG. 5.

Meanwhile, the locus of the movement A of the extreme end portion of the operating link 6 and the angle θ between the supporting link 8 and the movement locus A are determined by the lengths of the links 4 to 9 and the pivotally supporting positions at which the portions of the links are pivotally supported. Further, a wiping area to be wiped by the blade 3 is determined by the (horizontal) length of the blade 3 and the angle of rotation of the pivot shaft 10. In this case, the lengths of the links 4 to 9 and the pivotally supporting positions and the angle of rotation of the pivot shaft 10 are determined by, for example, a simulation performed by using a computer in such a way that the movement locus A, the angle θ and the wiping area are suited to the shape of the windshield of a vehicle. Moreover, for instance, in the case where the movement locus A extends in the horizontal direction and the angle θ is set so that the blade 3 is directed to, or extends in the vertical direction, the windshield surface can be wiped by the blade 3 which is oriented vertically and moves horizontally. Furthermore, the wiper device of the invention can deal with a parallelogramic windshield by setting the movement locus A extending in a slanting direction.

In the case of the wiper device structured as described above, the windshield surface W is wiped by the reciprocative movement of the blade 3 which is caused by the operation of the arm 2. The arm 2 comprises the seven joint-link mechanism consisting of six links, namely, the drive link 4, the connecting link 5, the operating link 6, the guide link 7, the supporting link 8 and the holding link 9. The operations of the links 4 to 9 cause the blade 3, which is held in such a manner as to lengthwise extend in the horizontal direction, to reciprocatively move nearly parallel to itself in the upward and downward directions.

As a result, the blade 3 can wipe nearly the entire rectangular windshield surface W. Thus, in the case of the wiper device of the invention, there are substantially no regions of the windshield surface left unwiped as opposed to the conventional wiper devices employing a blade that performs a wiping operation by swinging in an arc.

Moreover, the wiper device of the invention requires no complex mechanisms, such as a gear mechanism, and comprises only a link mechanism. Thus, the wiper device of the invention has a simple structure and restrains the number of components.

In addition, the wiper device of the invention can wipe a rectangular windshield surface by using a general-purpose system, which performs a stable wiping operation and includes a drive motor and pivot shaft as found in current wiping units without any modification. Thus, the increase in cost of the device relative to existing wiping devices is minimal.

Besides, in the case of the wiper device of the invention, when the blade 3 stops performing the wiping operation, most of the parts of the arm 2 are positioned outside the windshield surface W. Thus, there is no problem with the arm 2 covering the windshield surface and obstructing a driver's view which differs from the conventional wiper device employing two sets of link mechanisms. Consequently, the wiper device of the invention assures good visibility for the driver.

Needless to say, the invention is not limited to the first embodiment thereof. Although the connecting link 5 has the base end portion connected to the drive link 4 and has the extreme end portion connected to the guide link 7 in the case of the first embodiment, the wiper device may be configured so that the connecting link 5 has the base end portion connected to the guide link 7 and has the extreme end portion connected to the drive link 4 as in the case of a third embodiment of the present invention illustrated in FIG. 6. Further, in the case of the third embodiment of the invention, the base end portion of the holding link 9 is swingably and pivotally supported on a middle portion of the drive link 4. With such a configuration, the holding link 9 can achieve the function of holding the supporting link 9 at an approximately constant angle.

Incidentally, in the figures illustrating the second and third embodiments of the invention, like reference characters designate common or like components to the first embodiment of the invention.

Although the preferred embodiments of the invention have been described above, it should be understood that the invention is not limited thereto and that other modifications will be apparent to those skilled in the art without departing from the spirit of the invention.

What is claimed is:

1. A wiper device having a motor drive unit and an arm for moving a blade to be used to wipe a windshield surface, the arm comprising:
    a drive link having a base end portion swingably and pivotally supported on a vehicle body to reciprocatively swing according to a drive operation of the wiper drive unit;
    a connecting link having an end portion swingably and pivotally supported at an extreme end portion of the drive link;
    an operating link having a base end portion integrally fixed to the connecting link;
    a guide link having a base end portion swingably and pivotally supported on said vehicle body and an extreme end portion swingably and pivotally supported on the other end portion of the connecting link, the guide link operative to guide the operating link such that the extreme end portion of the operating link reciprocatively moves in an approximately straight line with a reciprocative movement of the drive link;
    a supporting link to which the blade is fixed, the supporting link having an end portion that is swingably and pivotally supported at the extreme end portion of the operating link; and
    a holding link having an extreme end portion swingably and pivotally supported at the other end portion of the supporting link, and a base end portion swingably and pivotally supported on a one of the guide link and the drive link, and that is operative to hold the supporting link in such a manner that an angle between the supporting link and a movement locus of the extreme end portion of the operating link is maintained at a nearly constant value.

2. A wiper device mounted to a vehicle for wiping a substantially rectangular window of the vehicle, comprising:
    a drive output shaft mounted to the vehicle;
    a blade having a length extending substantially parallel to a side of the rectangular window; and
    an arm between the output shaft of the drive motor and the blade, the arm comprising:
        a first link connected at a base end to one of the vehicle and the drive output shaft;
        a connecting link pivotally connected at a base end to an extreme end of the first link;
        a second link connected at a base end to the other of the vehicle and the drive output shaft, and pivotally connected at an extreme end of the connecting link;
        an operating link fixedly connected at a base end to the extreme end of the connecting link;
        a holding link pivotally connected to the second link at a point between the base end and the extreme end of the second link; and
        a supporting link having a base end pivotally connected to an extreme end of the operating link and an extreme end pivotally connected to an extreme end of the holding link, wherein the blade is mounted to the supporting link.

3. The wiper device according to claim 2, wherein the operating link is fixed to the connecting link to extend at an angle from an extension line of a longitudinal axis of the connecting link.

4. The wiper device according to claim 3, wherein the connecting link and the operating link are a unitary structure.

5. The wiper device according to claim 2, wherein the blade is mounted to the supporting link proximate the base end.

6. The wiper device according to claim 2, wherein the blade is mounted to a mid-portion of the supporting link.

7. The wiper device according to claim 2, wherein the first link is a drive link and the connection to the vehicle is a fixed connection to the drive output shaft.

8. The wiper device according to claim 7, wherein the second link is guide link and the connection to the vehicle is a pivotal connection.

9. The wiper device according to claim 2, wherein the second link is a drive link and the connection to the vehicle is a fixed connection to the drive output shaft.

10. The wiper device according to claim 9, wherein the first link is a guide link and the connection to the vehicle is a pivotal connection.

11. A wiper device driven by a motor unit having an output shaft and mounted to a vehicle to wipe a substantially rectangular window, the wiper device comprising:
    a blade mounted to extend substantially parallel to a side of the window; and
    a linking mechanism between the motor and the blade for moving the blade in a direction perpendicular to the direction in which the blade extends, wherein the blade during a wiping operation passes over substantially an entire surface of the window, the linking mechanism comprising:
        a supporting link to which the blade is mounted;
        a first link connected at a base end to one of the vehicle and the output shaft;
        a connecting link pivotally connected at a base end to an extreme end of the first link;
        a second link connected at a base end to the other of the vehicle and the output shaft and pivotally connected at an extreme end of the connecting link;

an operating link fixedly connected at a base end to the extreme end of the connecting link;

a holding link pivotally connected to the second link at a point between the base end and the extreme end of the second link, wherein the supporting link has a base end pivotally connected to an extreme end of the operating link and an extreme end pivotally connected to an extreme end of the holding link.

12. The wiper device according to claim 11, wherein a locus of movement of the pivotal connection of the operating link and the base end of the supporting link defines a line during operation, an angle of the supporting link to the line remaining constant over a range of movement.

13. The wiper device according to claim 11, wherein the first link is a drive link and the connection to the vehicle is a fixed connection to the output shaft.

14. The wiper device according to claim 13, wherein the second link is guide link and the connection to the vehicle is a pivotal connection.

15. The wiper device according to claim 11, wherein the second link is a drive link and the connection to the vehicle is a fixed connection to the output shaft.

16. The wiper device according to claim 15, wherein the first link is a guide link and the connection to the vehicle is a pivotal connection.

* * * * *